April 15, 1969     D. SCARAMUCCI     3,438,387
VALVE STRUCTURE

Filed Aug. 9, 1965

INVENTOR,
DOMER SCARAMUCCI

April 15, 1969  D. SCARAMUCCI  3,438,387
VALVE STRUCTURE

Filed Aug. 9, 1965  Sheet 2 of 2

INVENTOR.
DOMER SCARAMUCCI
BY
Dunlap and Laney
ATTORNEYS

United States Patent Office 3,438,387
Patented Apr. 15, 1969

3,438,387
VALVE STRUCTURE
Domer Scaramucci, Oklahoma City, Okla., assignor to Balon Corporation, Oklahoma City, Okla., a corporation of Oklahoma
Filed Aug. 9, 1965, Ser. No. 478,242
Int. Cl. F16k 1/226, 43/00; F16l 19/04
U.S. Cl. 137—315                              4 Claims

ABSTRACT OF THE DISCLOSURE

A valve including a chambered body having a movable valve member positioned therein and a passageway intersecting the chamber of the body and extending through the body to open at opposite sides thereof. A counterbore is formed in one end of this passageway to form a shoulder in the valve body, and a hollow fitting which has an exterior sized to fit snugly in the counterbore, and having an end face engaging the internal shoulder, is placed in the valve body within the passageway. The fitting has an annular shoulder on the exterior thereof which is disposed in the valve body, and the body is deformed inwardly to hook over or engage this annular shoulder.

---

This invention relates generally to improved valves and to improved methods for constructing valves. More particularly, but not by way of limitation, this invention relates to an improved valve wherein a novel method is utilized for constructing the valve body.

During the last few years, the manufacturing industry related to the production of valves has become highly competitive. Therefore, it is highly desirable to be able to produce a quality valve at the lowest possible manufacturing cost.

In the usual construction of valves, the valve body is generally cast and then machined to receive the movable valve member, seals, and operating members associated therewith. Frequently, the valve body is cored in the casting operation for receiving the valve member and the ends are provided with threads or flanges for connecting the valve in the fluid circuit. However, in order to insert the valve member in the valve body, the general practice has been either to provide an opening in the top of the valve which must subsequently be covered or to provide one end of the valve with a sufficiently large opening to permit the insertion of the valve member therethrough. Usually the large opening is provided with an internal thread for receiving a hollow fitting that partially closes the large opening in the valve body after the valve member has been placed therein.

The fitting is provided with exterior mating threads for connecting the fitting in the valve body. Also, an internal thread or flange is provided on the fitting for connecting the valve in the fluid circuit. Naturally, the additional machining required to form the mating threads has resulted in the increased manufacturing cost of the valve.

Occasionally, the fitting has loosened in the valve body due to vibration in the fluid circuit or, inadvertently, during the connection of the valve in the fluid circuit. The latter occurs primarily when the valve is connected in the fluid circuit by threads. In either case, the result of the loosening of the fitting results in the failure of the valve.

This invention provides a valve having a movable valve member mounted therein including a body member having a chamber for receiving the valve member, a passageway intersecting the chamber and extending through the valve body member, and a counterbore in one end of the passageway forming a shoulder in the valve body; and, a hollow fitting having an exterior sized to fit into the counterbore and having an end face engaging the shoulder, the fitting having an annular shoulder on the exterior thereof disposed within the body member and in engagement with the body member whereby the fitting is tightly retained in assembled relation with the body member.

In another aspect of this invention, there is provided a method of constructing a valve that includes the steps of forming a counterbore in the passageway in the valve body to provide a shoulder therein; inserting a hollow fitting having an exterior shoulder thereon into the counterbore until one end of the fitting is in engagement with the shoulder in the body; and, deforming a portion of the valve body inwardly into engagement with the exterior shoulder on the fitting, whereby the valve body and fitting are held in assembled relationship.

One object of the invention is to provide a novel method of constructing a valve whereby the valve may be manufactured less expensively.

Another object of the invention is to provide an improved valve that can be quickly, easily and economically constructed.

A further object of the invention is to provide an improved method of constructing a valve that eliminates the necessity for forming interior threads in the valve body and mating exterior threads on a hollow fitting inserted therein.

One other object of the invention is to provide a valve incorporating a novel means for attaching the end fittings to the valve body.

Still another object of the invention is to provide an improved valve that eliminates the necessity for a top opening in the valve body.

A still further object of the invention is to provide an improved method of connecting the hollow fitting with a valve body wherein the fitting is permanently restrained against movement relative to the valve body.

The foregoing and additional objects and advantages of the invention will become more apparent when the following detailed description is read in conjunction with the accompanying drawings wherein like reference characters denote like parts in all views and wherein.

Figure 1:
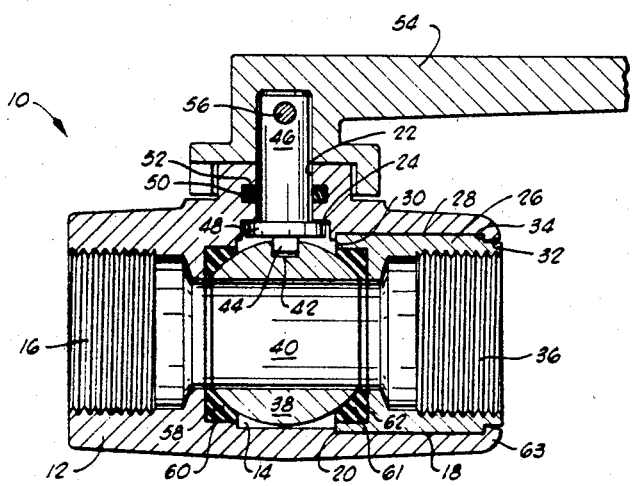
FIG. 1 is a vertical cross-sectional view of a ball valve constructed in accordance with one aspect of the invention.

Embodiment of FIG. 1

Referring to the drawing and to FIG. 1 in particular, shown therein and generally designated by the reference character 10 is a ball valve constructed in accordance with one aspect of the invention. The ball valve 10 includes a valve body 12 having a chamber 14 formed therein. A partially threaded opening 16 extends through one end of the valve body 12 intersecting the chamber 14. A counterbore 18 is formed in the other end of the valve body 12 forming a shoulder 20 adjacent the chamber 14 for purposes which will be described more fully hereinafter.

A transverse opening 22 extends through the wall of the valve body 12 intersecting the chamber 14. A downwardly facing surface 24 is provided in the valve body 12 at the juncture between the transverse opening 22 and the chamber 14 for purposes which will become more apparent hereinafter.

A hollow fitting 26 having an exterior 28 sized to fit into the counterbore 18 is disposed in the valve body 12. An end face 30 on the fitting 26 is in engagement with the shoulder 20 formed in the valve body 12. As clearly shown in FIG. 1, the outermost end of the hollow fitting 26 is provided with an annular recess 32 forming an exterior shoulder 34 thereon. The hollow fitting 26 also includes a partially threaded opening 36 that provides communication through the hollow fitting 26 with the chamber 14, completing a passageway that extends through the valve body 12.

A valve ball 38 having a flow port 40 extending therethrough is disposed in the chamber 14. The valve ball 38 is movable from an open position (as illustrated in FIG. 1) to a closed position (not shown) wherein the flow port 40 is disposed at substantially right angles to the passageway extending through the ball valve 10. The exterior surface of the valve ball 38 is provided with a recess 42 sized to receive a rectangular lower end 44 of a valve operating member 46.

The valve operating member 46 extends upwardly from the valve ball 38 through the transverse opening 22 in the valve body 12. In addition to the rectangular lower end 44, the valve operating member 46 also includes an annular flange 48 disposed in engagement with the surface 24 in the valve body 12 to limit the upward movement of the valve operating member 46 therein.

An O-ring seal 50 is located in an annular recess 52 formed in the valve body 12. The O-ring 50 is in sealing engagement with the valve body 12 in the transverse opening 22 and with the valve operating member 46.

The upper end of the valve operating member 46 is connected with an operating handle 54 by a pin 56. The valve operating handle 54 is preferably movable through an arc of approximately 90° to move the valve ball 38 between the open and closed positions.

As will be well understood by those skilled in the art, an annular upstream seal 58 is disposed in an annular recess 60 formed in the valve body 12 adjacent and encircling the opening 16. Similarly, an annular downstream seal 61 is disposed in a recess 62 formed in the hollow fitting 26 adjacent the chamber 14 and encircling the opening 36 in the hollow fitting 26. The upstream and downstream seals 58 and 61, respectively, are preferably constructed from a resilient material and are arranged to sealingly engage the exterior surface of the valve ball 38, providing a fluid-tight closure when the valve ball 38 is rotated to the closed position (not shown).

In constructing the ball valve 10, it is preferred that the exterior 28 of the fitting 26 be slightly larger in diameter than the diameter of the counterbore 18 so that the hollow fitting 26 must be pressed into the valve body 12. With an interference fit between the hollow fitting 26 and the valve body 12, a fluid-tight seal is formed therebetween preventing the escape of fluid from the chamber 14 and preventing the rotation of the hollow fitting 26 in the valve body 12 upon assembly of the ball valve 10 with sections of fluid conduit (not shown).

The hollow fitting 26 is pressed into the counterbore 18 until the end face 30 thereon engages the shoulder 20 formed in the valve body 12. An end portion 63 on the valve body 12 adjacent the counterbore 18 is then deformed inwardly, such as by rolling, until the end portion 63 engages the exterior shoulder 34 on the hollow fitting 26. The deformation of the end portion 63 of the valve body 12 into engagement with the hollow fitting 26 assures that the hollow fitting 26 will not be forced out of the valve body 12 by thrust forces developed as a result of fluid pressure within the chamber 14.

It can be appreciated from the foregoing detailed description, that a ball valve 10 constructed in accordance with the invention, can be manufactured more economically than valves currently being manufactured due to the elimination of the exterior threads on the hollow fitting 26 and the elimination of interior mating threads in the valve body 12. Furthermore, it should be apparent from the foregoing that the hollow fitting 26 is securely retained in the valve body 12 against rotation due to the interference fit therebetween. Relative longitudinal movement between the fitting 26 and valve body 12 is prevented by the deformation of the valve body 12 into engagement with the exterior shoulder 34 on the hollow fitting 26.

Figure 2:
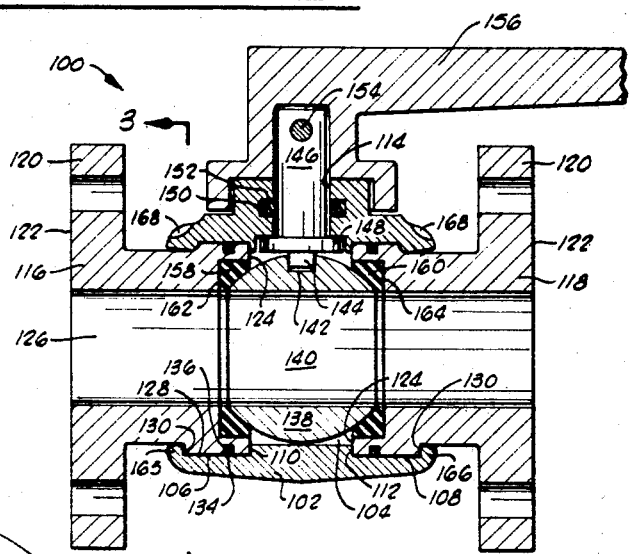
FIG. 2 is a vertical cross-sectional view of another embodiment of ball valve also constructed in accordance with the invention.

*Embodiment of FIG. 2*

FIG. 2 illustrates a ball valve generally designated by the reference character 100 and also constructed in accordance with the invention. As shown therein, the ball valve 100 includes a valve body 102 having a chamber 104 formed therein. The valve body 102 also includes counterbores 106 and 108 at each end thereof forming outwardly facing shoulders 110 and 112, respectively. A transverse opening 114 extends through the valve body 102 intersecting the chamber 104.

A pair of identically constructed fittings 116 and 118 are connected with the valve body 102 as will be described. In view of the identity of construction of the fittings 116 and 118, only the fitting 116 will be described in detail, it being understood that like reference characters apply to like parts of the fitting 118.

As illustrated in FIG. 2, the fitting 116 includes an annular flange 120 adjacent an outer end 122 thereon. An end face 124 provided on the opposite end of the fitting 116 is in engagement with the shoulder 110 formed in the valve body 102. (The end face 124 on the end fitting 118 is in engagement with the shoulder 112 of the valve body 102.) A bore 126 extends through the fitting 116 in coaxial alignment with the chamber 104 in the valve body 102 when the fitting 116 is assembled with the valve body 102.

The fitting 116 has an exterior 128 sized to fit within the counterbore 106 in the valve body 102. An outwardly facing shoulder 130 is formed on the exterior 128 of the fitting 116. As may be more clearly seen in FIG. 3, the shoulder 130 is provided with a plurality of notches 132 for purposes that will become more apparent hereinafter.

An O-ring seal 134 is disposed in an annular recess 136 encircling the exterior 128 of the fitting 116 to form a fluid-tight seal between the fitting 116 and the valve body 102. The O-ring seal 134 may be omitted from the ball valve 100 if the exterior 128 of the fitting 116 is sufficiently large to form an interference fit with the valve body 102 in the counterbore 106.

A valve ball 138 is disposed in the chamber 104 and has a flow port 140 extending therethrough. The exterior surface of the valve ball 138 is provided with a recess 142 sized to receive a rectangular end 144 of a valve operating member 146.

The valve operating member 146 extends through the transverse opening 114 in the valve body 102 and has an annular flange 148 thereon in engagement with the interior of the valve body 102 to limit the upward movement of the valve operating member 146 therein. An O-ring seal 150 is located in an annular groove 152 formed in the valve body 102 adjacent the opening 114. The O-ring seal 150 forms a fluid-tight seal between the valve operating member 146 and the valve body 102.

The upper end of the valve operating member 146 is connected by a pin 154 with a valve operating handle 156. The interconnection between the valve operating handle 156, valve operating member 146 and valve ball 138 is such that the valve ball 138 can be rotated between an open position (as illustrated in FIG. 2) and a closed position (not shown) wherein the flow port 140 in the valve ball 138 is disposed at approximately 90° relative to the position illustrated in FIG. 2.

Upstream and downstream seals 158 and 160, respectively, are disposed in annular grooves 162 and 164 formed in the fittings 116 and 118, respectively. The seals 158 and 160 are preferably constructed from a resilient material and are arranged to form a fluid-tight seal with the exterior surface of the valve ball 138, thereby providing a fluid-tight closure of the valve 100 when the valve ball 138 is in the closed position (not shown).

In constructing the valve 100, it is preferred that the fittings 116 and 118 be cast with the notches 132 formed therein during the casting procedure. If the notches 132 are formed in the fittings 116 and 118 during the casting process, the only machining required is to face the ends 124 and 122 and to turn the exterior 128 to the required dimension. However, the notches 132 can be machined if desired.

The finished end fittings 116 and 118 are inserted into the counterbores 106 and 108, respectively, in the valve body 102 after the valve operating member 146 and valve ball 138 have been placed therein. The fittings 116 and 118 are inserted into the counterbores 106 and 108, respectively, until the ends 124 thereon engage the shoulders 110 and 112, respectively. The end portions 165 and 166 of the body 102 adjacent the fittings 116 and 118, respectively, are then rolled or otherwise deformed inwardly into engagement with the shoulders 130 on the fittings 116 and 118.

Figure 3:
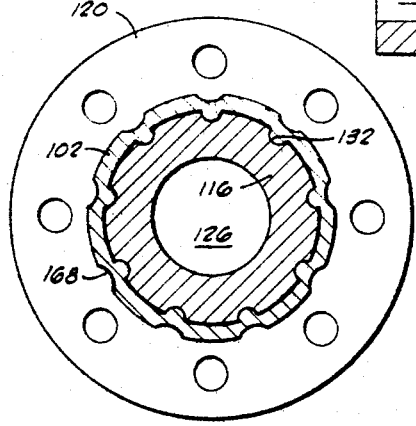
FIG. 3 is a transverse cross-sectional view taken generally along the line 3—3 of FIG. 2.

The end portions 165 and 166 are deformed sufficiently so that the material of the valve body 102 enters the notches 132 in the fittings, as illustrated in FIG. 3. As the material of the valve body 102 enters the notches 132 slight depressions 168 appear on the exterior of the valve body 102.

After the valve body 102 has been deformed as described, it can be appreciated from viewing FIG. 2 that the fittings 116 and 118 are held securely in the valve body 102. Thrust developed within the valve 100 by fluid pressure is resisted by the deformed end portions 165 and 166 of the valve body 102. Also, it can be appreciated from viewing FIGS. 2 and 3 that the notches 132 formed in the shoulders 130 of the fittings 116 and 118 resist relative rotation between the valve body 102 and the fittings 116 and 118.

It should be understood that one of the fittings 116 or 118 may be formed integrally with the valve body 102 similar to the construction of the valve 10 as previously described. Also, it should be understood that the valve 10 may be provided with notches, such as the notches 132 of the valve 100, in the shoulders 34 thereon if desired to prevent relative rotational movement between the fitting 26 and the valve body 12.

Figure 4:
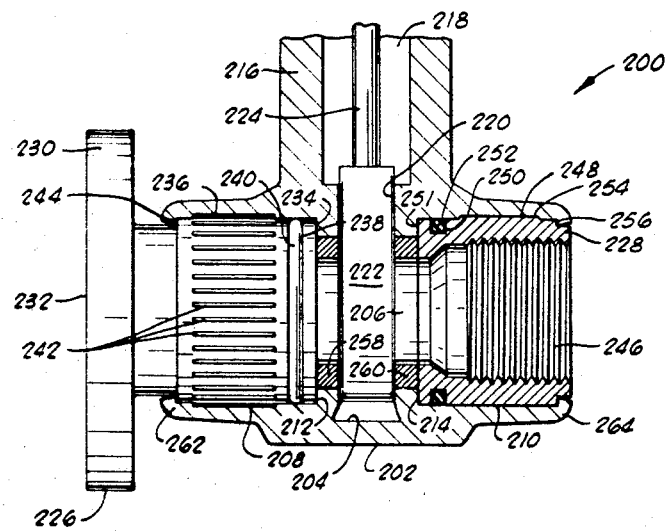
FIG. 4 is a fragmentary, vertical cross-sectional view taken through a gate valve also constructed in accordance with the invention.

*Embodiment of FIG. 4*

The fragmentary cross-sectional view of FIG. 4 illustrates a gate valve, generally designated by the reference character 200, and also constructed in accordance with the invention. As illustrated therein, the gate valve 200 including a valve body 202 having a chamber 204 formed therein. A passageway 206 extends through the valve body 202.

A counterbore 208 is formed in one end of the passageway 206 and a counterbore 210 is formed in the opposite end of the passageway 206. The counterbore 208 forms an outwardly facing shoulder 212 and the counterbore 210 forms an outwardly and oppositely facing shoulder 214 in the valve body 202.

The valve body 202 also includes a hollow, upwardly extending portion 216 having an interior 218 aligned with a transverse opening 220 extending into the chamber 204. As will be understood by those skilled in the gate valve art, the transverse opening 220 is sized to receive a valve gate member 222 that is movable into and out of the passageway 206 to open and close the gate valve 200. A valve operating member 224 has a lower end connected with valve gate member 222 and an upper end connected with an operating handle (not shown) arranged to move the valve operating member 224 and valve gate member 222 into and out of the chamber 204, thereby opening and closing the valve 200.

As illustrated in FIG. 4, a fitting 226 is partially disposed in the counterbore 208 and a fitting 228 is disposed in the counterbore 210. The fitting 226 includes an exterior flange 230 adjacent an end face 232 thereon. Although not shown, it will be understood that the end fitting 226 also includes an opening that is coaxially aligned with the passageway 206 in the valve 200. An end face 234 on the fitting 226 is in engagement with the shoulder 212 in the valve body 202 when the fitting 226 is assembled therewith.

The fitting 226 has an exterior 236 that is provided with an annular groove 238 carrying an O-ring seal 240. The O-ring seal 240 is in fluid-tight engagement with the valve body 202 in the counterbore 208 and with the fitting 226.

The exterior 236 of the fitting 226 is also provided with a plurality of longitudinally extending serrations 242. The serrations 242 have an outside diameter larger than the diameter of the counterbore 208. Since the serrations 242 are larger than counterbore 208, pressing the fitting 226 into the counterbore 208 forms mating grooves in the valve body 202, thereby affording a means for resisting relative rotation between the fitting 226 and the valve body 202. An exterior shoulder 244 is formed on the exterior 236 of the fitting 226 for purposes that will become more apparent hereinafter.

The fitting 228 includes an opening 246 extending therethrough in coaxial alignment with the passageway 206 and the opening (not shown) in the fitting 226. An exterior 248 of the fitting 228 is provided with an annular groove 250 having an O-ring seal 252 disposed therein. The O-ring seal 252 is in fluid-tight sealing engagement with the fitting 228 and with the valve body 202 in the counterbore 210. An end face 251 on the fitting 228 is disposed in engagement with the shoulder 214 in the valve body 202 when the fitting 228 is assembled therewith.

The exterior 248 of the fitting 228 is also provided with a plurality of longitudinally extending serrations 254 (only one is shown in FIG. 4) that are constructed and arranged similarly to the serrations 242 of the fitting 226. The serrations 254 have an outside diameter larger than the diameter of the counterbore 210 and when assembled with the valve body 202 form a plurality of mating longitudinal grooves therein, thereby resisting rotational movement between the fitting 228 and the valve body 202. An exterior shoulder 256 is formed on the exterior 248 of the fitting 228 for purposes that will become more apparent hereinafter.

An annular seal 258 is disposed in the valve body 202 encircling the opening (not shown) in the fitting 226 and located between the end face 234 of the fitting 226 and the valve gate member 222. An annular seal 260 is disposed in the valve body 202 encircling the opening 246 in the fitting 228 and located between the end face 251 of the fitting 228 and the valve gate member 222. As will be readily understood by those skilled in the art, the seals 258 and 260 are preferably constructed from a relatively resilient material and are arranged to form a fluid-tight seal with the valve gate member 222 when the valve gate member 222 is in the closed position as illustrated in FIG. 4.

In assembling the valve 200, the seals 258 and 260 may be bonded to the end faces 234 and 251 of the fittings 226 and 228, respectively, if desired. In any event, the seals 258 and 260 are inserted in the valve body 202 and the end fittings 226 and 228 pressed therein. As previously mentioned, pressing the fittings 226 and 228 into the counterbores 208 and 210, respectively, forms a plurality of mating grooves in the body 202. The end fittings 226 and 228 are pressed into the body 202 until the end faces 234 and 251 thereon are in engagement with the shoulders 212 and 214, respectively, in the valve body 202. After the fittings 226 and 228 are in place in the valve body 202, the end portions 262 and 264 on the valve body 202 adjacent the counterbores 208 and 210, respectively, are deformed inwardly, such as by rolling, into engagement with the exterior shoulders 244 and 256 of the fittings 226 and 228, respectively.

When the deformation of the valve body 202 has been completed, it can be appreciated that the fittings 226 and 228 are permanently connected with the valve body 202 and that the deformed portions 262 and 264 thereon resist end thrust developed as a result of pressure within the valve 200. Also, and as previously pointed out, the fittings cannot be rotated relative to the valve body 202 due to the engagement of the serrations on the exteriors thereof with the valve body 202. Thus, it can be seen that the structure described in connection with the valve 200 also avoids the necessity of forming exterior threads on the fittings and interior mating threads in the valve body. Manifestly, with the structure described, the valve 200 can be more economically constructed than a comparable valve utilizing the usual mating thread construction for connecting the fittings in the valve body.

It should also be pointed out that the fittings 226 and 228 may be identically constructed if desired or only one fitting may be utilized. In the instance where only one fitting is utilized, the fitting on the opposite end of the valve body will be constructed integrally therewith.

Figure 5:
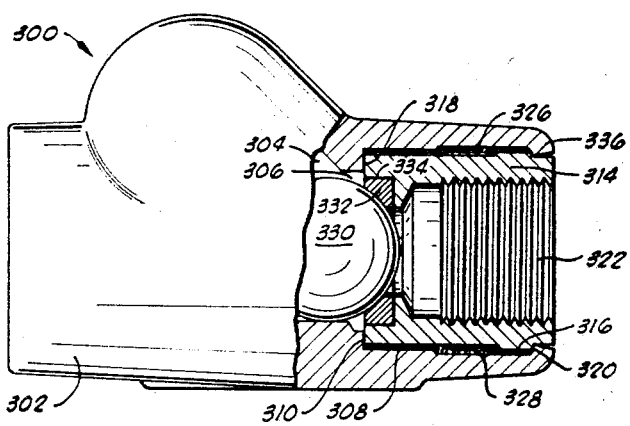
FIG. 5 is a view, partly in elevation and partly in cross-section illustrating the structure of a check valve constructed in accordance with another embodiment of the invention; and, FIG. 6 is a fragmentary view, partly in cross section and partly in elevation, of a portion of the check valve of FIG. 5 showing the structure thereof prior to assembly.

*Embodiment of FIG. 5*

FIG. 5 illustrates the application of another embodiment of the invention to a check valve structure. As illustrated therein, the check valve is generally designated by the reference character 300 and includes a valve body 302. The valve body 302 includes a chamber 304 and a passageway 306 (only partially shown) extending therethrough. A counterbore 308 in the passageway 306 forms a shoulder 310 in the valve body 302. As shown most clearly in FIG. 6, an annular recess 312 is formed in the valve body 302 adjacent the outermost end of the counterbore 308.

An end fitting 314 having an exterior 316 sized to fit closely within the counterbore 308 is disposed in the counterbore 308 as shown in FIG. 5. The fitting 314 includes an end face 318 that engages the shoulder 310 when the fitting 314 is inserted in the valve body 302. An exterior shoulder 320 is also provided on the exterior of the fitting 314 for purposes that will become more apparent hereinafter. The fitting 314 also includes a partially threaded opening 322 (see FIG. 5) that is coaxially aligned with the passageway 306 extending through the valve body 302.

Figure 6:
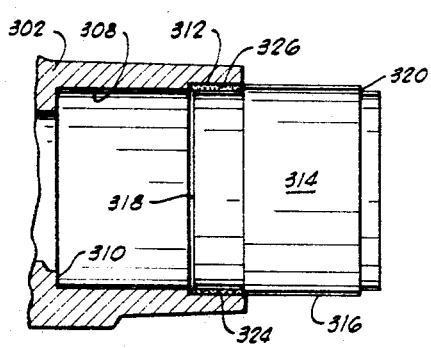

As may be seen most clearly in FIG. 6, the fitting 314 includes an annular recess 324 encircling the exterior end portion thereof adjacent the end face 318. In constructing the valve body 302 and the fitting 314, the recesses 312 and 324 are preferably very shallow. In the actual construction of the valve 300, the recesses 312 and 324 have a depth less than the diameter of particles contained in a particulate material 326 that is placed in each of the recesses 312 and 324.

The particulate material 326 may be one of the various thread locking compounds currently available commercially. For example, Bakerlok," sold by Baker Oil Tools, Inc. of Los Angeles, Calif., may be used if desired. "Bakerlok" sets, that is, it hardens after application to securely hold the mating parts against relative movement.

If the particle size in the compound selected is not of the desired size, particles of a very hard material, such as carbide, may be added thereto. Although the preferred material 326 will both harden and contain the desired size of particles, non-hardening materials, such as "pipe dope" or grease, can be used effectively when they contain particles of the desired size.

With the relative depths of the recesses 312 and 324 and the size of the particles in the particulate material 326 arranged as described, the insertion of the fitting 314 into the counterbore 308 forces the particulate material 326 between the exterior 316 on the fitting 314 and the valve body 302 in the counterbore 308. As the fitting 314 is inserted in the counterbore 308, the particulate material forms or cuts a plurality of longitudinal grooves 328 (see FIG. 5) in the exterior surface 316 of the fitting 314 and in the valve body 302 adjacent the counterbore 308. It can be appreciated that the particles of the particulate material 326 in the longitudinal grooves 328 engage both the fitting 314 and the valve body 302 to resist relative rotational movement therebetween.

A valve ball 330 is disposed in the chamber 304 and is movable therein from the closed position illustrated in FIG. 5, wherein the valve ball engages an annular seal 332, to an open position (not shown) wherein the valve ball 330 moves out of the passageway 306 extending through the valve body 302 to permit flow through the valve 300.

The annular seal 332 is located in an annular recess 334 formed in the end face 318 of the fitting 314 and is preferably constructed from a relatively resilient material whereby an effective fluid-tight seal is formed with the valve ball 330 when the valve ball 330 is in the position closing the valve 300.

In assembling the valve 300, the fitting 314 is pressed into the counterbore 308 in the valve body 302 until the end face 318 on the fitting 314 engages the shoulder 310 in the valve body 302. With the fitting 314 in the position described, the end 336 of the valve body 302 is deformed inwardly, such as by rolling, until the end 336 engages the exterior shoulder 320 formed on the fitting 314. After the deformation of the valve body 302 has been completed, it can be appreciated that the fitting 314 is securely and permanently restrained in the valve body 302 and, therefore, resists thrust forces developed by fluid pressure in the valve 300 attempting to force the fitting 314 out of the body 302.

From the foregoing detailed descriptions of the various embodiments of valves constructed in accordance with the invention, it can be seen that the various fitting structures are permanently retained in assembled relation with the valve bodies and are securely held against both relative rotation between the valve body and the fittings and against thrust forces developed in the valves. Manifestly, the fitting structures described may be constructed much more economically than previously known structures wherein mating threads are provided on the fitting and in the valve body.

One other advantage of valves constructed as described hereinbefore is that a single type of valve body may be stocked by the user of the valve. By stocking both flanged and threaded end fittings, the user of the valve can quickly adapt the valve body for use with either flanged or threaded fittings or any combination of the flanged and threaded fittings described. Therefore, the valve structures described provide the advantage of versatility coupled with the economic advantages previously pointed out.

It should be understood that the embodiments described in detail hereinbefore are presented by way of example only and that many changes and modifications can be made thereto without departing from the spirit of the invention or from the scope of the annexed claims.

What I claim is:
1. A valve comprising:
   A valve body having a passageway extending therethrough, a chamber intersecting said passageway, and a counterbore in one end of said passageway forming a shoulder in said valve body, said body being deformed radially inwardly at the opposite end of said counterbore from said shoulder;

a valve member disposed in said chamber and movable between a position wherein said pasageway is open and a position wherein said passageway is closed;

a fitting having a bore therethrough aligned with said passageway, an exterior sized to fit into said counterbore and an end face engaging said shoulder, said fitting further having an annular shoulder on the exterior thereof disposed in said body, and in engagement with said deformed portion of the valve body, whereby said valve body and fitting are held in assembled relationship;

means preventing relative rotational movement between said fitting and valve body; and a resilient seal interposed between, and concurrently sealingly engaging said fitting and said valve member, said seal being spaced from said shoulder in said valve body.

2. The valve as defined in claim 1 wherein said means for preventing relative rotational movement between said fitting and valve body comprises notches in said fitting within and in engagement with said valve body.

3. The valve as defined in claim 1 and further characterized to include seal means between said hollow fitting and valve body for preventing leakage between the fitting and the valve body.

4. The valve as defined in claim 1 wherein said means for preventing relative rotational movement between said fitting and valve body comprises a particulate material positioned between and engaging the exterior of the fitting and the interior of the valve body.

References Cited

UNITED STATES PATENTS

| | | | |
|---|---|---|---|
| 1,291,388 | 1/1919 | Bright et al. | 285—382 X |
| 2,728,135 | 12/1955 | Rockwell | 29—157.1 |
| 2,890,856 | 6/1959 | Clade | 251—361 X |
| 3,055,100 | 9/1962 | Kimpel | 285—382 X |
| 3,078,754 | 2/1963 | De Lacy. | |
| 3,144,804 | 8/1964 | Harwood | 29—511 X |
| 3,155,368 | 11/1964 | Shafer | 251—175 |
| 3,287,034 | 11/1966 | Bragg | 285—382 X |

WILLIAM F. O'DEA, *Primary Examiner.*

D. R. MATTHEWS, *Assistant Examiner.*

U.S. Cl. X.R.

29—505; 251—309, 315, 367; 285—382